United States Patent [19]

Shores

[11] 4,328,792
[45] May 11, 1982

[54] SOLAR HEAT COLLECTOR

[75] Inventor: Marvin W. Shores, Pomona, Calif.

[73] Assignee: General Dynamics, Pomona Division, Pomona, Calif.

[21] Appl. No.: 112,053

[22] Filed: Jan. 14, 1980

[51] Int. Cl.³ ............................................. F24J 3/02
[52] U.S. Cl. ................................... 126/438; 126/417; 126/424; 126/443; 126/450; 126/439
[58] Field of Search ............... 126/443, 424, 425, 438, 126/439, 450, 417

[56] References Cited

U.S. PATENT DOCUMENTS

| | | | |
|---|---|---|---|
| 3,884,217 | 5/1975 | Wartes | 126/439 |
| 3,954,097 | 5/1976 | Wilson, Jr. | 126/438 |
| 4,015,584 | 4/1977 | Haberman | 126/438 |
| 4,027,653 | 6/1977 | Meckler | 126/443X |
| 4,030,477 | 6/1977 | Smith | 126/438 |
| 4,086,911 | 5/1978 | Futch | 126/450 |
| 4,092,979 | 6/1978 | Kotlarz | 126/443 X |
| 4,100,915 | 7/1978 | Carlson | 126/438 X |
| 4,109,640 | 8/1978 | Smith | 126/424 |
| 4,119,085 | 10/1978 | Knowles et al. | 126/438 X |
| 4,224,082 | 9/1980 | Jacobson | 126/438 X |

*Primary Examiner*—Larry Jones
*Attorney, Agent, or Firm*—Henry M. Bissell; Edward B. Johnson

[57] ABSTRACT

A solar heat collector utilizing an elongated vertical mast to support a rectangular parabolic reflector and a transparent cover. The mast is located at the focal point of the parabolic reflector, and the fluid to be heated enters the unit at the bottom, is partially heated as it rises by convection, enters the mast at the upper portion thereof, and is transported downward while being further heated due to the mast focal point location. The unit is rotatable about the mast to maximize heat transfer.

14 Claims, 7 Drawing Figures

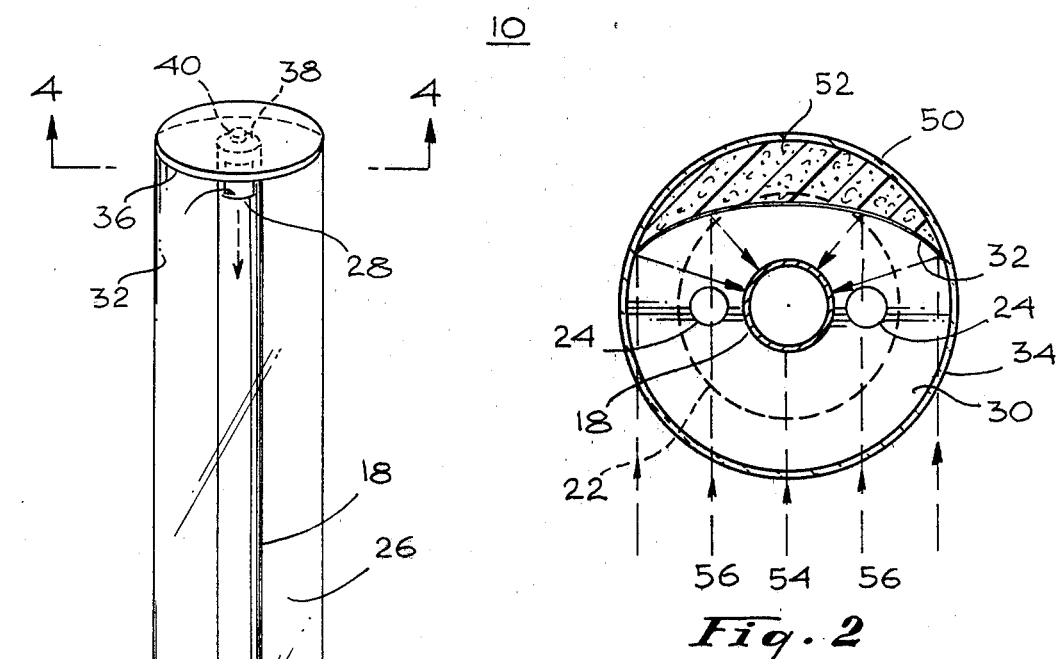
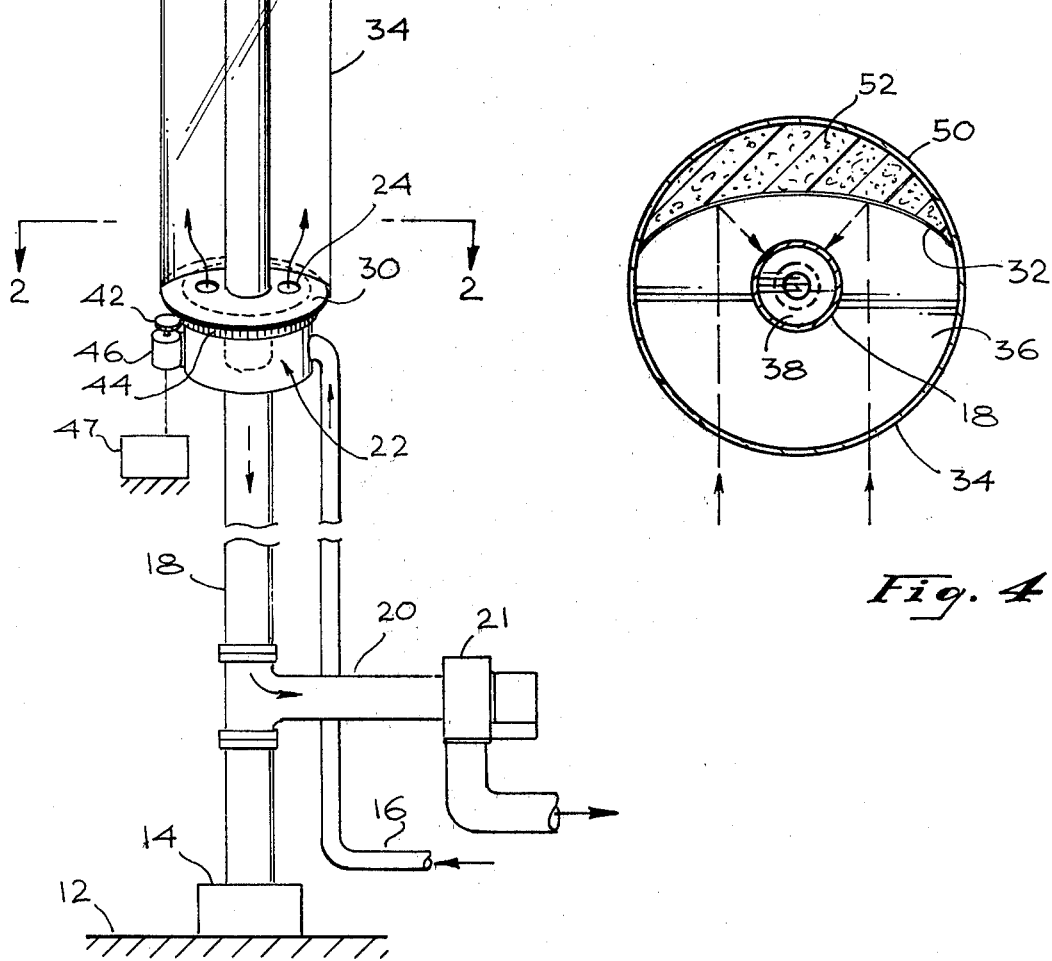
Fig. 2
Fig. 4
Fig. 1

SOLAR HEAT COLLECTOR

BACKGROUND OF THE INVENTION

1. Summary of the Invention

The present invention relates to solar heat collectors, and in particular relates to a very simple unit with efficient heat transfer characteristics.

2. Description of the Prior Art

Many different systems have been designed for use in connection with solar heat collectors. The art contains examples of single tubes, aligned in fixed beds to evaporate water and produce steam, conical collectors with central fluid transfer systems, spherical units, and many other different styles of units. All of these fixed type of units suffer from the disadvantage of being immobile, and thus being incapable of compensating for the daily motion of the sun from horizon to horizon. In order to overcome this type of problem, various complex units have been designed. An exemplary unit is that disclosed in U.S. Pat. No. 3,884,217 of Wartes which utilizes plural prismatic, independently adjustable reflectors which pivot to collect the sun's rays, and reflect them to a second reflective surface which then directs them to the actual heat transfer section. The whole collector is also pivoted to aid the compensating for the sun's daily motion. The unit is thus quite complex and expensive and requires considerable mechanical manipulation in order to function properly.

The complexity of this type of system is overcome, for example, by the system disclosed by Futch in U.S. Pat. No. 4,086,911. This system merely uses numerous tubes positioned in a truncated cone designed to absorb heat. Such a simple system, however, is quite inefficient as it cannot be moved in order to increase the amount of energy absorbed to the level of complex systems.

Additionally, various other attempts at producing functional solar heating systems are disclosed in U.S. Pat. Nos. 4,109,640 of Smith; 4,119,085 of Knowles et al, and 4,138,061 of Besack. All of these lack efficiency or are quite complex.

U.S. Pat. No. 4,015,584 of Haberman discloses another apparatus for solar heat collecting. The apparatus utilizes a plurality of vertical tubes, and the structural requirements for window mounting result in a relatively complex unit of limited size and heating capacity. Thus, it is of relatively limited utility as compared to a fixed position, high-surface-area unit. On the other hand, Wilson, in U.S. Pat. No. 3,954,097, discloses a simpler unit, in that a vertical tube is used to both provide fluid flow and support a parabolic surface. However, in order to provide the fluid flow, a complex, expensive structure is necessary. Further, a significant relatively flat, external cross-sectional surface area is disclosed, which would present dangers when roof-mounted as suggested, due to possible wind damage.

It is therefore an object of the present invention to develop a simple solar heat collector which is more efficient that the "flat plate" type of units that are normally placed on rooftops, and also close to the efficiency of the units which are movable in two planes (azimuth and elevation) without requiring the complex structure needed for such motion. It is a further object of the present invention to provide maximum surface area, with minimum use of space during orientation or rotation of the unit. Also an object is to provide such a unit that has the ability to withstand winds of relatively high speed and that is rotatable during such high wind velocities, without great increase in structural weight.

SUMMARY OF THE INVENTION

To the above ends, a solar heat collector has been designed which is mechanically much simpler that the two-plane adjustable collectors. Further, it heats air nearly as well as such collectors, and is more efficient than flat plate collectors. These and other improvements are effected by the production of a solar collector in which a vertically oriented, elongated tube or pipe is used as a mast, or main mounting portion, for the solar collector. The tube or pipe is provided with an air or other fluid inlet at the top, preferably to the side at the top, with mounting means for the remainder of the unit being placed at the very top of the collector tube or mast. The mast has an outlet at the bottom for fluid exit. A parabolic reflective surface is mounted in a relatively cylindrical shell which is transparent in the region facing the concave side of the parabolic reflector. Those two pieces, the reflector and shell, are provided as a unit and mounted to the mast in a rotatable manner, such that the axis of the mast is identical to the focal axis of the parabolic reflective surface and, preferably, the same as the axis of the surrounding cylindrical shield. At the bottom of this structure, a manifold is provided surrounding the mast. Air or other fluid inlet means is connected to the manifold and the manifold communicates directly with the internal portion of the chamber produced by the shell and the parabolic reflector. It should be noted that the radius of the manifold, as far as the fluid supply portion thereof is concerned, should be equal to or less than the radius of the cylindrical shell so that the manifold is in continual supply contact with the chamber. Preferably, mounted externally around the manifold are an electrical motor and drive means, such as a ring gear, mounted on the underside of the container. The drive structure is utilized to rotate the parabolic reflector and keep it pointing directly towards the sun. One example of the equipment useful in performing the function of a heliostat or sun tracker, which controls the rotation, is disclosed in U.S. Pat. No. 4,027,651 to Roland W. Robbins, Jr. but other devices, known in the art, may be used.

As a result of the design of the present invention, a solar collector with significantly higher energy absorption than the planar fixed-position type of collector is provided. Additionally, the absorption characteristics of the collector of the present invention are very nearly equivalent to those of the complex units which are adjustable both in elevation and azimuth. As a matter of fact, the present unit is usually equivalent to the complex units at all times except when the sun is at its maximum height, and at this time there is only a slight efficiency decrease as compared to the more complex units.

BRIEF DESCRIPTION OF THE DRAWINGS

A better understanding of the present invention may be had by considering the following detailed description, taken in conjunction with the accompanying drawings in which:

FIG. 1 shows a side view of a solar collector of the present invention;

FIG. 2 is a section taken along lines 2-2 of FIG. 1;

FIG. 4 is a sectional view taken along lines 4-4 of FIG. 1;

DESCRIPTION OF THE PREFERRED EMBODIMENTS

Figure 3:
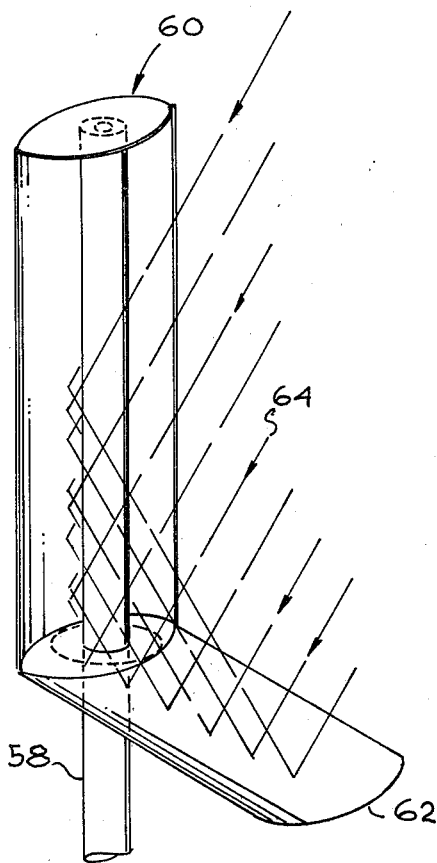
FIG. 3 is an isometric view, in schematic form of one preferred embodiment.

In FIG. 1, the single plane solar collector of the present invention, generally indicated by number 10, is supported on the ground 12 or other similar surface by base 14. In is understood that the unit could be roof-mounted, and plural brackets could be provided for support. The positioning of the collector of the present invention, of course, would be dictated by the availability of sunlight, which depends on such factors as geographical location, adjacent buildings, trees, etc.

In any event, in the embodiment shown the fluid to be heated, which is preferably air but may be other gaseous material if desired, enters pipe 16 and is discharged through mast 18 and pipe 20, after being heated in the solar collector 10. In the embodiment shown, manifold 22 is connected to pipe 16, but it is to be understood that pipe 16 could be located inside mast 18, which is hollow, and feed manifold 22 from the inside, or directly feed chamber 26. In the preferred embodiment, a blower 21 is provided downstream of pipe 20 to pull the air through the solar collector of the present invention, and to direct the heated air to utilization equipment. Exemplary uses include the heating of a bed of rock or other material with a high specific heat for storage, direct heating of room air, or heating of water for domestic use.

The air entering pipe 16 and manifold 22 is vented into chamber 26 through ventholes 24 shown in FIG. 1. The air then travels upward through chamber 26 of the solar collector, being heated during the whole of its passage by direct exposure to the sunlight, enters mast 18 at aperture 28 and is drawn downward through the mast and heated further. The focal axis of parabolic reflector surface 32 is the center of the mast (as better shown in FIG. 2) and, thus, significant heating occurs during the downward travel of the air. Further, by this arrangement, colder air enters the lower portion of the solar collector of the present invention, is heated, and rises to the upper portion, at least somewhat by its own accord. This arrangement in the present design minimizes fan load requirements. As better shown in FIG. 2, transparent surface 34 cooperates with parabolic reflector surface 32, and along with lower surface 30 and upper surface 36 of the collector, these provide a chamber which is sealed from external atmospheric involvement.

Furthermore, mast 18 is provided with cap 38 which cooperates with upper cover 36 to position mast 18 so that its axis is also the focal axis of the parabolic reflective surface. In its preferred form, in this portion of the structure of the present invention, shaft 38 is centered in indentation 40 in cover 36 and would be held in place, for example, by a bearing or bushing to ease the rotation of the unit of the present invention.

Rotation is effected by motor 46 mounted conveniently adjacent manifold 22, and provided with gear drive 42 which drives gear 44 on the bottom of the unit of the present invention. The rotation of the unit about the mast 18 can be effected by the driving of the motor 46 responsive to the signals of a heliostat or sun tracker 47 to maintain the parabolic reflector facing the sun at all times. Other drive means could be utilized, but this drive means allows rotation of the collector of the present invention without great space requirements, produces accurate rotation, and does not require provision of flexible couplings since the drive gear can be sealed against manifold 22, and be an integral portion of collector 10.

FIG. 2, the section taken on along lines 2—2 of FIG. 1, shows transparent surface 34, parabolic reflective surface 32, and mast 18 in section. Mast 18, in this area, would preferably be painted black for maximum energy absorption, and would be directly impinged by sunlight as indicated by arrows 54. Air is provided through inlets 24 which communicate directly with manifold 22. In addition, the area between the rear of parabolic reflector 32 and the exterior 50 of the collector is preferably insulated with, for instance, a lightweight foamed plastic 52, such as polyurethane. It should be noted that rear surface 50 may be of the same material as transparent surface 34 or different, and it is not necessary that this rear surface be transparent.

In FIG. 3, an additional embodiment of the present invention is shown in a schematic drawing. Mast 58 is provided with collector 60, in an alternative form which is more fully described in FIG. 5. Collector 60 may take the same circular shape as defined in FIGS. 1 and 2; however, in this embodiment a flat reflector plate 62 is provided extending horizontally outward from the base of the assembly. This plate 62 reflects sunlight into the parabolic reflector, thus providing an additional capture area without altering the single axis rotational feature of the unit. As indicated by arrows 64, the sunlight is directed to the axis of collector 60, and thus the energy available for absorption by the fluid in the solar collector of the present invention is significantly increased.

FIG. 4 is a further detailed drawing taken along the lines 4—4 of FIG. 1 showing in section, rear surface 50, insulation 52, mast 18, parabolic reflective surface 32 and transparent surface 34, as in FIGS. 1 and 2. However, in this figure, mounting shaft 38 is more clearly shown. Shaft 38 is mounted, as described hereinabove, to provide the appropriate stability and seal for the solar collector of the present invention.

Figure 5:
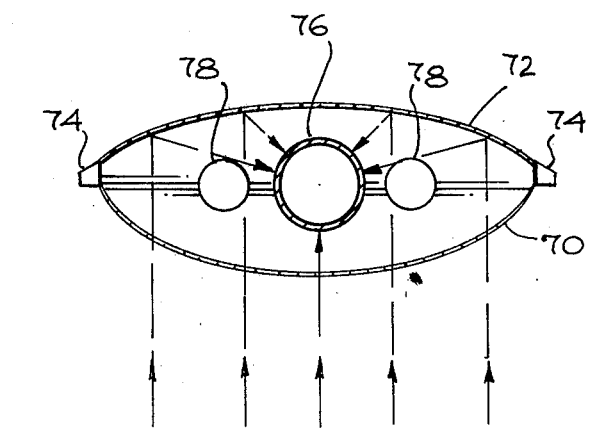
FIG. 5 is a schematic top view of another embodiment.

In FIG. 5, an alternative embodiment with a different external shape is depicted. In this embodiment, transparent surface 70 is of an appropriate curvature to decrease wind friction and force upon the collector, and is sealed and secured to parabolic reflective surface 72 by means of the seals 74. The schematic view in FIG. 5 is essentially a section taken along the same location at line 2-2 in FIG. 1 and thus shows mast 76 in its central location having an axis which is the same as the focal axis of the parabolic reflector 72. Fluid inlet apertures 78 provide for fluid flow into the chamber in the solar collector of this embodiment.

Figure 6:
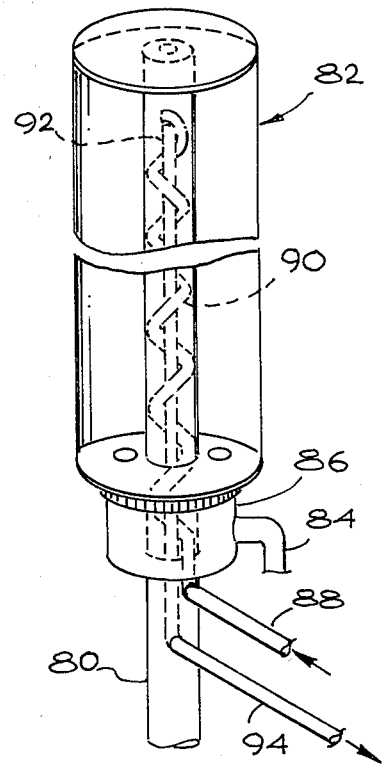
FIG. 6 is a partial schematic view of a third embodiment.

In FIG. 6, another embodiment of the present invention is shown schematically. In this figure, mast 80 and parabolic solar collector 82 are generally shown, along with fluid inlet 84 and manifold 86. These portions function in the same manner as previously described. However, in this embodiment, an additional fluid inlet and outlet system is added to the unit. In this system the fluid would normally be water, for use in household hot water heating, and the water would be provided at inlet 88, and traverse spirally up the inside of mast 80 through tubing 90 to the area near the top of the unit. At this point, unit 90 would be coupled with vertical straight tubing section 92 and the water would be drawn downward to and through outlet 94. The preferred direction of flow is upward through the long spiral section and downward through the shorter section so that heat absorption and thus efficiency could be maximized. In this form, mast 80 could be clear or the spiral tubing could be in intimate contact with the mast, such as by welding the two together, in order to increase absorption. It would further be preferable that vertical line 92 be heat absorptive, or black, in order to further maximize heat and energy absorption.

Figure 7:
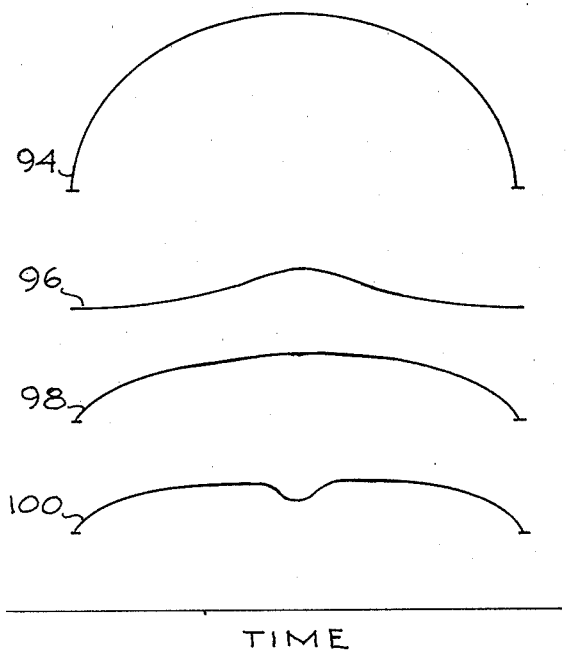
FIG. 7 is a graphical representation comparing the efficiency of various collectors.

In FIG. 7, a comparison, on a relative basis, of the energy absorption characteristics of various types of solar collectors is made. Arc 94 represents an approximation of the angle of deflection of the sun from the horizon during a given day, and thus energy availability. The center of the arc being approximately at noon, when the sun reaches its highest point and the angle of deflection at dawn and at dusk being minimal. Curve 96 shows the relative absorption of energy by a fixed plate solar collector, the unit being positioned for maximum absorption, and absorbing the maximum amount of energy at the time when the sun is highest in its arc. Curve 98 shows the energy absorption of a double plane adjustable solar collector wherein there is relatively constant adjustment, both as to azimuth and elevation, to compensate for the changing position of the sun. Using this equipment, once the sun has reached a reasonable angle from the horizon, and the level of energy available from the sun has become significant, the level of absorption by this complex type of unit is maximized, and stays relatively constant until the sun starts to set.

Curve 100 shows the capacity for energy absorption by the unit of the present invention in comparison with the other curves. The single planar adjustment used in the present invention causes the absorption rate to rise as rapidly as it does with a double adjustable unit, and follow the same pattern. However, there is a slight decrease in absorption when the sun is providing its maximum energy. Thus, a very efficient, simple unit is provided. It should be noted that all of the curves indicated by 96, 98 and 100 are normalized to per-unit area, and thus are comparisons of relative unit output.

Although there have been described above specific arrangements of a single plane, parabolic collector in accordance with the invention, for the purpose of illustrating the manner in which the invention may be used to advantage. It will be appreciated that the invention is not limited thereto. For example, while the invention has been disclosed in the context of association with air heating, the principles of the invention are equally applicable to the heating of other gaseous material. Further, a particular arrangement for the inlet and exit of the air is provided, but the invention would be easily applied to the manifolding of the entrance air into a central tube, inside the mast at the manifold to provide the air to the bottom of the collector container. Accordingly, any and all modifications, variations or equivalent arrangements, including those noted above, which may occur to those skilled in the art, should be considered to be within the scope of the invention as defined in the appended claims.

What is claimed is:

1. Solar energy collecting apparatus comprising:
    a solar collector including a parabolic reflector supported on a vertical mast, the mast being hollow and extending along the focal axis of the reflector to heat fluid within the mast;
    an enclosure for the parabolic reflector including at least a portion of a right circular cylinder having its axis aligned with the focal axis of the reflector and defining, with said reflector, a chamber for the flow of fluid vertically along the reflector outside the mast;
    upper and lower covers connected with the chamber to close the ends thereof; and
    means for directing the flow of fluid upward through the chamber and returning through the mast, comprising an opening in the lower cover communicating with the chamber outside the mast, an opening in the mast adjacent the upper end thereof within the chamber, and an opening in the mast at the lower end thereof outside the collector, the opening being effective to permit the flow of fluid through the collector as it is heated initially in said chamber during upward flow and subsequently in said mast during return flow.

2. The apparatus of claim 1 further including means for rotating the collector about the mast to maintain the parabolic reflector facing the sun.

3. The apparatus of claim 2 further comprising a manifold extending from the lower end of the collector chamber and communicating therewith through openings in the lower cover, and duct members connected respectively to the manifold and to the lower opening of the mast to transmit fluid to and from the collector for heating.

4. The apparatus of claim 3 further comprising a blower of reduced volumetric capacity connected to the duct member at the outlet opening at the base of the mast for drawing air through the solar collector for heating, the flow of air drawn by the blower being augmented by the natural convection flow induced by the heating of air within the solar collector.

5. The apparatus of claim 1 wherein the portion of the cylinder extending about the concave side of the parabolic reflector is transparent to sunlight.

6. The apparatus of claim 1 wherein the cylinder is a complete right circular cylinder extending entirely around the parabolic reflector to provide a symmetrical external surface for equalizing wind loading, regardless of wind direction and orientation of the reflector.

7. The apparatus of claim 6 wherein the cylinder defines an enclosed space on the convex side of the parabolic reflector, and further comprising support and insulating means filling said space behind the reflector.

8. The apparatus of claim 7 wherein the last-mentioned means comprises a lightweight foamed plastic material.

9. The apparatus of claim 1 further comprising a generally horizontal reflector plate extending outwardly from the collector in the vicinity of the bottom thereof in the direction the parabolic reflector is facing in order to provide additional capture area for increasing the sunlight directed to the reflector.

10. The apparatus of claim 1 further including piping extending vertically within the hollow mast and connected to inlet and outlet tubing mounted through the tubular wall of the mast below the solar collector for the flow of water for heating within the mast, whereby the solar collector is effective to heat both air and water in separate ducts.

11. The apparatus of claim 10 wherein the piping comprises a first, relatively straight pipe extending along the axis of the mast and a second pipe in a spiral shape surrounding the first pipe and connected to the upper end of the first pipe for the return of water heated within the first pipe.

12. The apparatus of claim 11 wherein both the mast and the portion of the cylindrical housing in front of the parabolic reflector are fabricated of clear material which is transparent to sunlight.

13. Solar energy collecting apparatus comprising:
- a solar collector including a parabolic reflector supported on a vertical mast, the mast being hollow and extending along the focal axis of the reflector;
- an enclosure for the parabolic reflector including at least a portion of a right circular cylinder having its axis aligned with the focal axis of the reflector and defining, with said reflector, a chamber for the flow of fluid vertically along the reflector and mast;
- upper and lower covers connected with the chamber to close the ends thereof;
- means for directing the flow of fluid through the collector and mast, comprising an opening in the lower cover communicating with the chamber outside the mast, an opening in the mast adjacent the upper end thereof within the chamber, and an opening in the mast at the lower end thereof outside the collector, the openings being effective to permit the flow of fluid through the collector as it is heated therein;
- means for rotating the collector about the mast to maintain the parabolic reflector facing the sun; and
- a bearing mounted in the upper cover for rotatably supporting the collector on the upper end of the mast.

14. Solar energy collecting apparatus comprising:
- a solar collector including a parabolic reflector supported on a vertical mast, the mast being hollow and extending along the focal axis of the reflector;
- an enclosure for the parabolic reflector including at least a portion of a right circular cylinder having its axis aligned with the focal axis of the reflector and defining, with said reflector, a chamber for the flow of fluid vertically along the reflector and mast;
- upper and lower covers connected with the chamber to close the ends thereof;
- means for directing the flow of fluid through the collector and mast, comprising an opening in the lower cover communicating with the chamber outside the mast, an opening in the mast adjacent the upper end thereof within the chamber, and an opening in the mast at the lower end thereof outside the collector, the openings being effective to permit the flow of fluid through the collector as it is heated therein; and
- means for rotating the collector about the mast to maintain the parabolic reflector facing the sun comprising a motor and drive means coupled to rotate the collector, and a heliostat coupled to control the drive motor in accordance with the direction of the sun relative to the orientation of the collector.

* * * * *